(12) United States Patent
Kimura (10) Patent No.: US 12,252,210 B2
(45) Date of Patent: Mar. 18, 2025

(54) SHOCK ABSORBER (71) Applicant: Hitachi Astemo, Ltd., Hitachinaka (JP)

(72) Inventor: Tsubasa Kimura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 853 days.

(21) Appl. No.: 17/406,668

(22) Filed: Aug. 19, 2021

(65) Prior Publication Data

US 2021/0380193 A1    Dec. 9, 2021

Related U.S. Application Data (63) Continuation of application No. PCT/JP2019/014913, filed on Apr. 4, 2019.

(51) Int. Cl.
*B62K 25/08* (2006.01)
*F16F 9/32* (2006.01)
*F16F 9/36* (2006.01)

(52) U.S. Cl.
CPC ............ *B62K 25/08* (2013.01); *F16F 9/3242* (2013.01); *F16F 9/325* (2013.01); *F16F 9/364* (2013.01); *F16F 9/3257* (2013.01)

(58) Field of Classification Search
CPC ........ F16F 9/3242; F16F 9/3253; F16F 9/325; F16F 9/364; F16F 9/3257; B60G 13/08; B60G 230/12; B60G 2206/41; B60G 2204/4232; B62K 25/08
USPC ....................................................... 267/195
See application file for complete search history.

(56) References Cited

U.S. PATENT DOCUMENTS

| | | | | |
|---|---|---|---|---|
| 4,290,511 A | * | 9/1981 | de Baan | F16J 15/3228 |
| | | | | 184/19 |
| 6,343,807 B1 | * | 2/2002 | Rathbun | B62K 25/08 |
| | | | | 280/276 |
| 6,918,605 B2 | * | 7/2005 | Wada | B62K 25/08 |
| | | | | 280/279 |
| 9,604,694 B2 | * | 3/2017 | Tomiuga | B62K 25/08 |
| 10,399,402 B2 | * | 9/2019 | Prevot | B60G 17/04 |
| 10,987,988 B2 | * | 4/2021 | Garcia | B60G 17/08 |
| 11,760,147 B2 | * | 9/2023 | Aoki | F16F 9/0227 |
| | | | | 188/297 |

(Continued)

FOREIGN PATENT DOCUMENTS

CN    205173342 U    4/2016
DE         52970 A1   12/1966

(Continued)

OTHER PUBLICATIONS

International Search Report mailed May 7, 2019 for the corresponding PCT International Patent Application No. PCT/JP2019/014913.

(Continued)

*Primary Examiner* — Bradley T King
*Assistant Examiner* — James K Hsiao
(74) *Attorney, Agent, or Firm* — Leason Ellis LLP; Edward J. Ellis; Melvin C. Garner (57) ABSTRACT

A shock absorber includes a tubular outer tube, a tubular inner tube, a rod, a piston, an urging member, and a guide bush. The guide bush is a ring-shaped member arranged along an inner periphery of the outer tube, abuts against a front surface and a rear surface of the inner tube to movably hold the inner tube, and is separated from left and right side surfaces of the inner tube.

20 Claims, 8 Drawing Sheets

(56) References Cited

U.S. PATENT DOCUMENTS

| | | | |
|---|---|---|---|
| 2004/0041063 A1 | 3/2004 | Enders et al. | |
| 2005/0073128 A1* | 4/2005 | Wada | B62K 25/08 280/279 |
| 2005/0145456 A1* | 7/2005 | Tomonaga | B62K 25/08 188/297 |
| 2006/0137947 A1* | 6/2006 | Fujita | B62K 25/08 188/315 |
| 2012/0181127 A1* | 7/2012 | Keil | F16F 9/3235 188/297 |
| 2014/0157978 A1* | 6/2014 | Kamioka | B62K 25/08 92/51 |
| 2014/0252706 A1* | 9/2014 | Kamioka | B60G 15/061 267/217 |
| 2020/0340547 A1* | 10/2020 | Nakano | F16F 13/007 |
| 2021/0078376 A1 | 3/2021 | Aoki | |
| 2022/0126945 A1* | 4/2022 | Chen | B62K 21/20 |

FOREIGN PATENT DOCUMENTS

| | | |
|---|---|---|
| DE | 102014112523 A1 | 3/2016 |
| JP | 02-012543 U | 1/1990 |
| JP | 2002-089606 A | 3/2002 |
| JP | 2003-329075 A | 11/2003 |
| JP | 2006-207689 A | 8/2006 |
| JP | 2009281542 A | 12/2009 |
| JP | 6405076 B1 | 10/2018 |

OTHER PUBLICATIONS

Written Opinion mailed May 7, 2019 for the corresponding PCT International Patent Application No. PCT/JP2019/014913.
Indian Office Action mailed Mar. 8, 2022 for the corresponding Indian Patent Application No. 202147037619, 7 pages.
Indian Hearing Notice mailed Jan. 5, 2024 for the corresponding Indian Application No. 202147037619 (3 pages).
German Office Action mailed Aug. 16, 2024 for the corresponding German Patent Application No. 112019006719.2 (12 pages including English translation).

* cited by examiner

SHOCK ABSORBER

CROSS-REFERENCE TO RELATED APPLICATION

This application is a Continuation of PCT application No. PCT/JP2019/014913, which was filed on Apr. 4, 2019, the content of which is incorporated herein by reference in its entirety.

FIELD OF THE INVENTION

The present invention relates to a shock absorber that attenuates impact energy received from a road surface or the like during traveling of a vehicle.

BACKGROUND OF THE INVENTION

A vehicle wheel of a straddle-type vehicle represented by a motorcycle is supported via a shock absorber. A front fork supports a front wheel and a rear cushion supports a rear wheel, and the front fork and the rear cushion play a role in attenuating impact energy received from a road surface or the like during traveling of the vehicle. As a technique in the related art, there is a technique disclosed in Patent Literature JP-A-2002-89606.

Patent Literature JP-A-2002-89606 discloses a hydraulic shock absorber having an outer cylinder formed into a circular shape whose inner peripheral surface is elliptical and whose outer peripheral side is coaxial with an inner peripheral side. According to the hydraulic shock absorber disclosed in Patent Literature JP-A-2002-89606, bending strength and bending rigidity can be increased.

There has been known that, for example, as a front fork that supports a front wheel of a straddle-type vehicle, an inner tube is slidably held inside an outer tube via a guide bush, and a rod and a piston are provided inside the inner tube. One of the outer tube and the inner tube is connected to a vehicle body, and the other is connected to the front wheel. For example, when an occupant applies a brake, the outer tube and the inner tube are compressed to absorb a part of the impact energy by a damping force generated by the piston when the outer tube and the inner tube are compressed.

In such a front fork, when the occupant applies the brakes, a load is applied to the inner tube from a front-rear direction that is a direction intersecting an axial direction. When the load is applied in the front-rear direction, the inner tube expands in a left-right direction and deforms into a flat shape, which may hinder a displacement of the inner tube in an upper-lower direction. When the displacement is hindered, there is a possibility that the energy applied to the vehicle cannot be appropriately attenuated, and therefore it is desired to improve this.

SUMMARY OF THE INVENTION

An object of the present invention is to provide a shock absorber capable of obtaining an appropriate damping force even when a load is applied.

As a result of an intensive study, the present inventors have found that it is possible to provide a shock absorber capable of obtaining an appropriate damping force even when a load is applied by bringing a guide bush to abut against a front surface and a rear surface of an inner tube to movably hold the inner tube, and separating the guide bush from left and right side surfaces of the inner tube. The present invention has been completed based on these findings.

Hereinafter, the present invention will be described. In the following description, for ease of understanding of the present invention, reference numerals in the accompanying drawings are appended in parentheses, but the present invention is not limited to the illustrated embodiments.

According to an aspect of the present invention, there is provided a shock absorber (10; 10A; 10B; 30) including:

a tubular outer tube (12; 12A; 12B) that is connectable to either a vehicle wheel (Fw, Rw) or a vehicle body (Bo);

a tubular inner tube (13; 13B) that includes a distal end (13u) provided inside the outer tube and a terminal end (13d) being connectable to either the vehicle wheel or the vehicle body (Bo) to which the outer tube is not connected, is provided so as to be movable relative to the outer tube, and is filled with oil (Oi) therein;

a rod (14) that is provided inside the inner tube and is supported by the outer tube or the inner tube;

a piston (15; 15B) that is fixed to the rod and is configured to generate a damping force when the inner tube moves relative to the outer tube;

an urging member (16) that is configured to urge the outer tube and the inner tube in a direction in which the outer tube and the inner tube are separated from each other; and a guide bush (17; 17A; 17B) that is a ring-shaped member arranged along an inner peripheral surface of the outer tube, abuts against a front surface (13f; 13Bf) and a rear surface (13r; 13Br) of the inner tube to movably hold the inner tube, and is separated from left and right side surfaces (13s; 13Bs) of the inner tube.

At least when a load in a direction intersecting an axis (CL) of the inner tube (13) is not applied, an inner peripheral surface and an outer peripheral surface of the inner tube may have a circular cross-sectional shape with the axis as a normal direction.

An inner peripheral surface of the guide bush (17) may have a cross-sectional shape with the axis as the normal direction, which is longer in a left-right direction than in a front-rear direction.

The inner peripheral surface of the outer tube (12) may have a shape along an outer peripheral surface of the guide bush at least at a portion where the outer tube comes into contact with the guide bush fixed in the outer tube.

As for a wall thickness of the guide bush (17), a thickness (t3) of portions thereof that abut against the front and rear surfaces of the inner tube (13) may be thickest, and a thickness (t4) of portions thereof that face the left and right side surfaces of the inner tube may be thinnest.

As for a wall thickness of the outer tube (12), a thickness (t1) of a portion thereof that faces the thickest portion of the guide bush (17) may be thickest, and a thickness (t2) of a portion thereof that faces the thinnest portion of the guide bush may be thinnest.

A material of the guide bush (17; 17A; 17B) may have a Young's modulus lower than that of a material of the inner tube (13; 13B).

An inner peripheral length of the guide bush (17) may be shortest at an upper end and may be longest at a lower end.

The inner peripheral length of the guide bush (17) may continuously increase from the upper end to the lower end.

An outer peripheral length of the guide bush (17) may be the same from the upper end to the lower end.

The wall thickness of the guide bush may be the thickest at the upper end and the thinnest at the lower end.

According to another aspect of the present invention, there is provided a shock absorber (10; 10A; 10B) including:
a tubular outer tube (12) that is connectable to a vehicle body (Bo);
a cylindrical inner tube (13) that is a member made of steel in which a distal end (13u) is provided inside the outer tube, is provided so as to be movable relative to the outer tube, is filled with oil (Oi) and includes a terminal end (13d) being connectable to a vehicle wheel (Fw, Rw);
a rod (14) that is provided inside the inner tube and is supported by the outer tube or the inner tube;
a piston (15) that is fixed to the rod and is configured to generate a damping force when the inner tube moves relative to the outer tube;
an urging member (16) that is configured to urge the outer tube and the inner tube in a direction in which the outer tube and the inner tube are separated from each other; and
a guide bush (17) made of an aluminum-based alloy that is an elliptical ring-shaped member arranged along an inner peripheral surface of the outer tube, abuts against a front surface (13f) and a rear surface (13r) of the inner tube to movably hold the inner tube, and is separated from left and right side surfaces (13s) of the inner tube.

As for a wall thickness of the guide bush, a thickness (t3) of portions thereof that abut against the front and rear surfaces of the inner tube is thickest, and a thickness (t4) of portions thereof that face the left and right side surfaces of the inner tube is thinnest, and the wall thickness of the guide bush is the thickest at an upper end, and is the thinnest at a lower end.

An inner peripheral surface of the guide bush has a tapered shape, in which an inner peripheral length is shortest at the upper end, and is longest at the lower end.

An outer peripheral length of the guide bush is the same from the upper end to the lower end.

In the present invention, the vehicle wheel (Fw, Rw) may be a front wheel (Fw).

According to the present invention, it is possible to provide the shock absorber capable of obtaining an appropriate damping force even when a load is applied.

DETAILED DESCRIPTION OF THE INVENTION

Embodiments of the present invention will be described below with reference to the accompanying drawings. In the description, left and right refer to left and right sides with respect to an occupant of a two-wheeled vehicle, and front and rear refer to front and rear sides with respect to a traveling direction of the vehicle. In the drawings, Fr indicates a front direction, Rr indicates a rear direction, Le indicates a left direction when viewed from the occupant, Ri indicates a right direction when viewed from the occupant, Up indicates an upper direction, and Dn indicates a lower direction.

Figure 1:
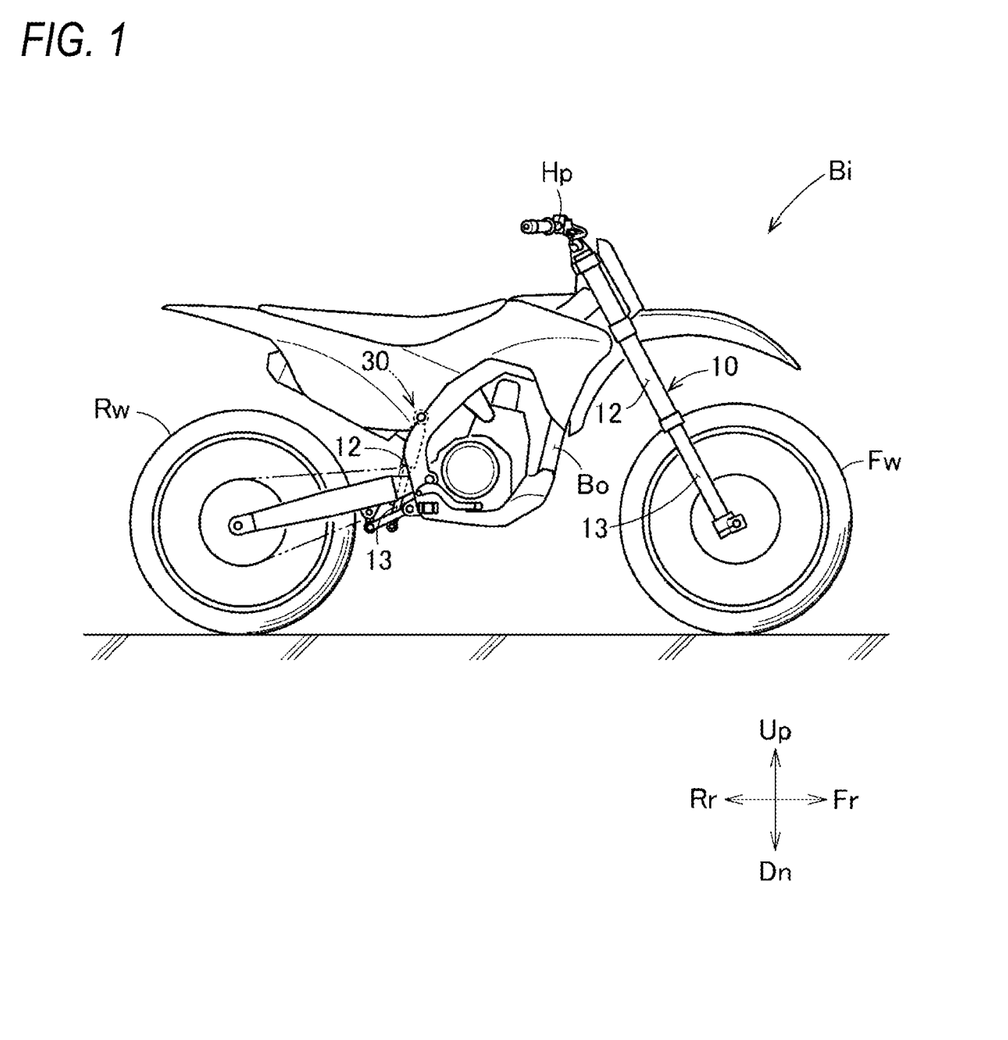
FIG. 1 is a side view of a two-wheeled vehicle on which a front fork and a rear cushion according to a first embodiment are mounted.

Reference is made to FIG. 1. In a motorcycle Bi, it is considered that a shock absorber 10 (front fork 10) on a front wheel Fw side is more frequently subjected to a load such that an inner tube 13 has a flat shape than a shock absorber 30 (rear cushion 30) on a rear wheel Rw side. Therefore, a case where the shock absorbers 10, 30 of the present invention are each the front fork 10 will be described below, but the shock absorbers 10, 30 of the present invention may be the rear cushion 30. That is, a basic configuration of the rear cushion 30 is the same as that of the front fork 10. Reference numerals are used and a detailed description thereof will be omitted. The embodiments shown in the accompanying drawings are examples of the present invention, and the present invention is not limited to the embodiments.

First Embodiment

Figure 2:
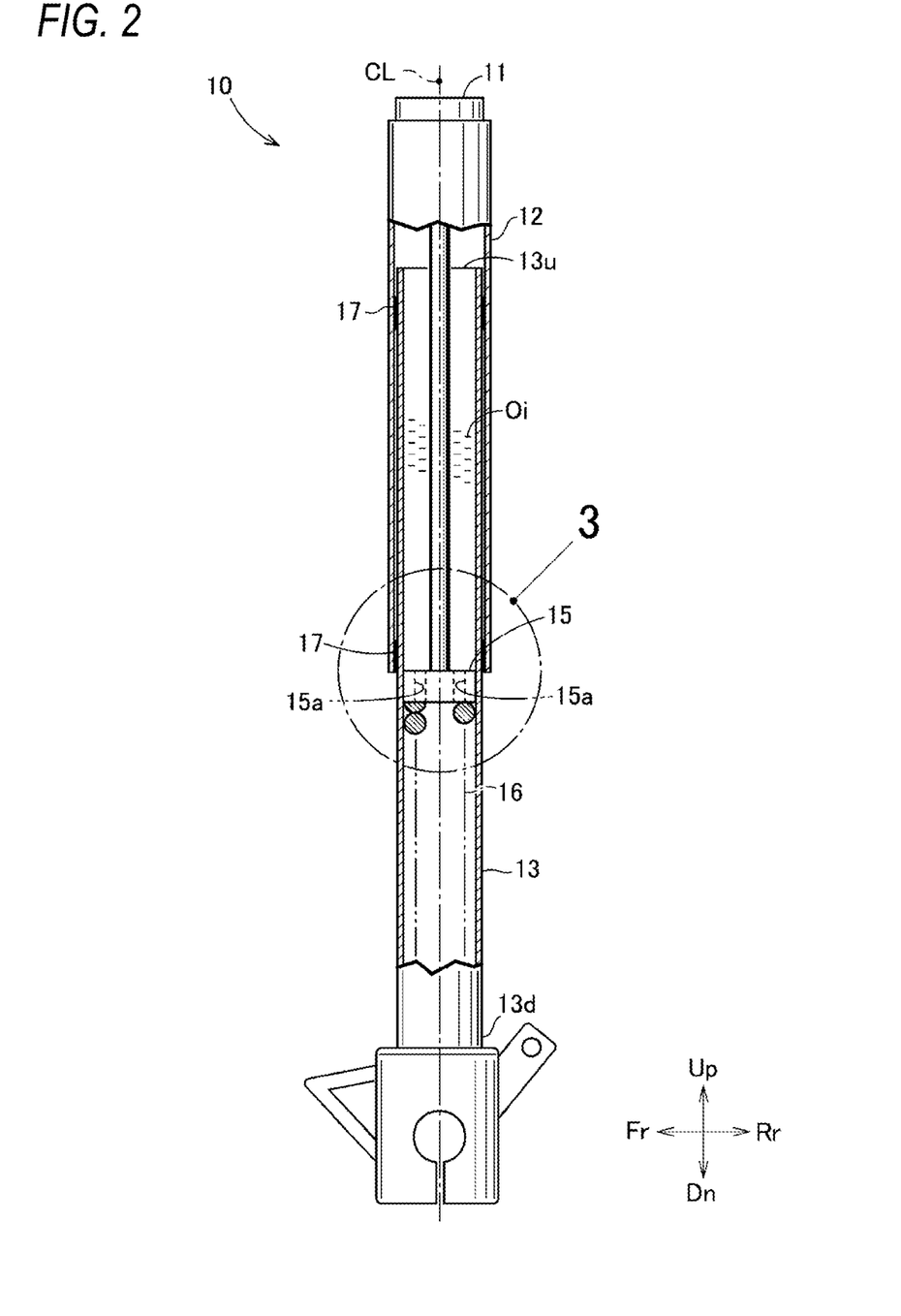
FIG. 2 is a front view of the front fork shown in FIG. 1.

Reference is also made to FIG. 2. FIG. 2 shows an inverted front fork 10. The front fork 10 is bridged from the vicinity of a handle pipe Hp of the motorcycle Bi to the front wheel Fw, for example, and attenuates impact energy or the like input from a road surface.

The front fork 10 includes a substantially cylindrical outer tube 12 whose upper end is closed by a lid 11 and that is connectable to a vehicle body, a substantially cylindrical inner tube 13 in which an upper end 13u (distal end 13u) is provided inside the outer tube 12 and a lower end 13d (the other end 13d) is connectable to the front wheel, a rod 14 that is provided inside the inner tube 13 and supported by the outer tube 12, a piston 15 that is fixed to a distal end of the rod 14 and generates a damping force when the inner tube 13 moves with respect to the outer tube 12, an urging member 16 that urges the outer tube 12 and the inner tube 13 in a direction in which the outer tube 12 and the inner tube 13 are separated from each other, and two guide bushes 17, 17 that are ring-shaped members arranged along an inner peripheral surface of the outer tube 12 and movably hold the inner tube 13.

Both of the two guide bushes 17, 17 have the same configuration. Hereinafter, only the guide bush 17 arranged below will be described, and the description of the guide bush 17 arranged above will be omitted.

The lid 11 closes the upper end of the outer tube 12 and supports the rod 14. The lid 11 is detachably attached to the outer tube 12.

Figure 3:
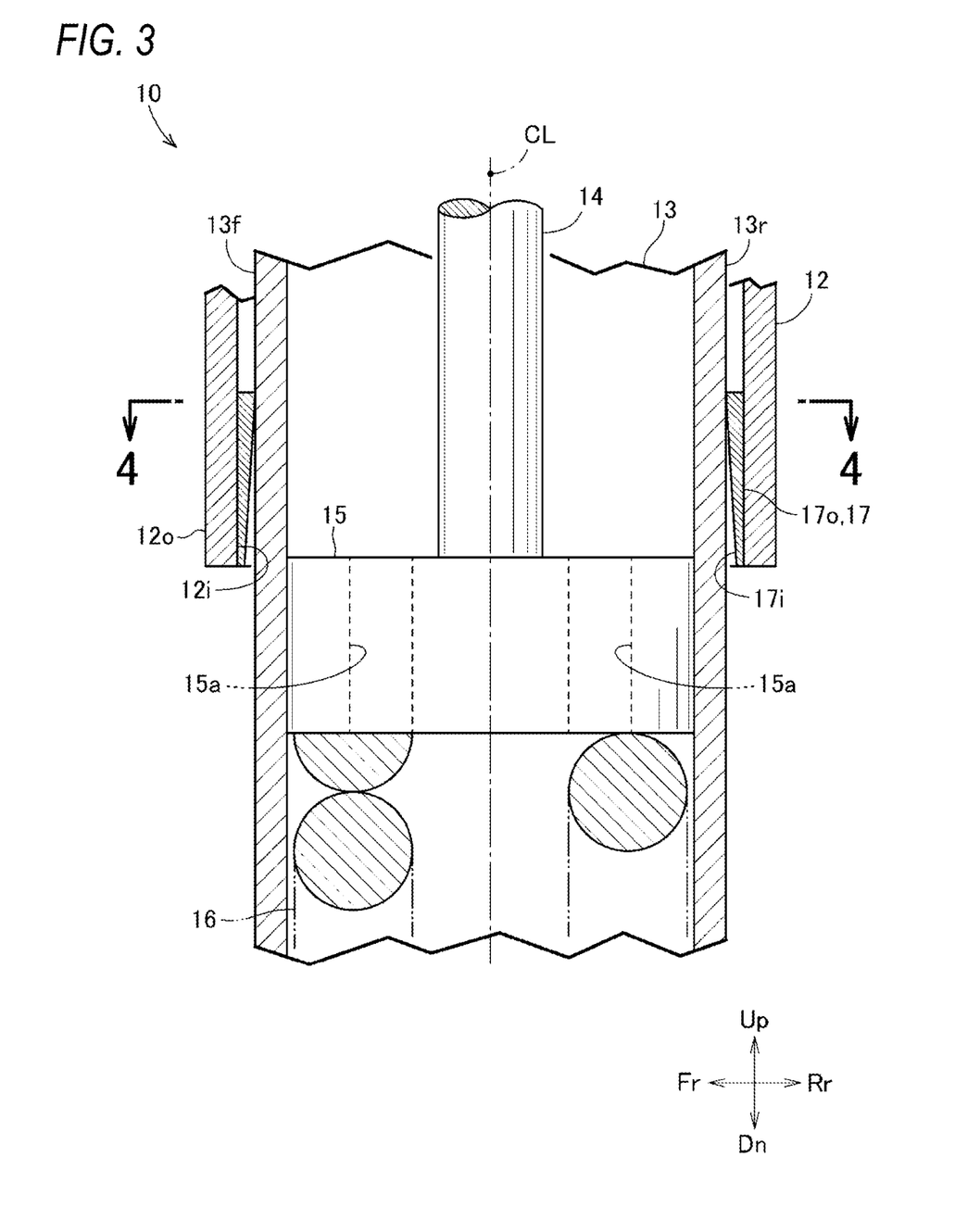
FIG. 3 is an enlarged view of a part 3 in FIG. 2.
Figure 4:
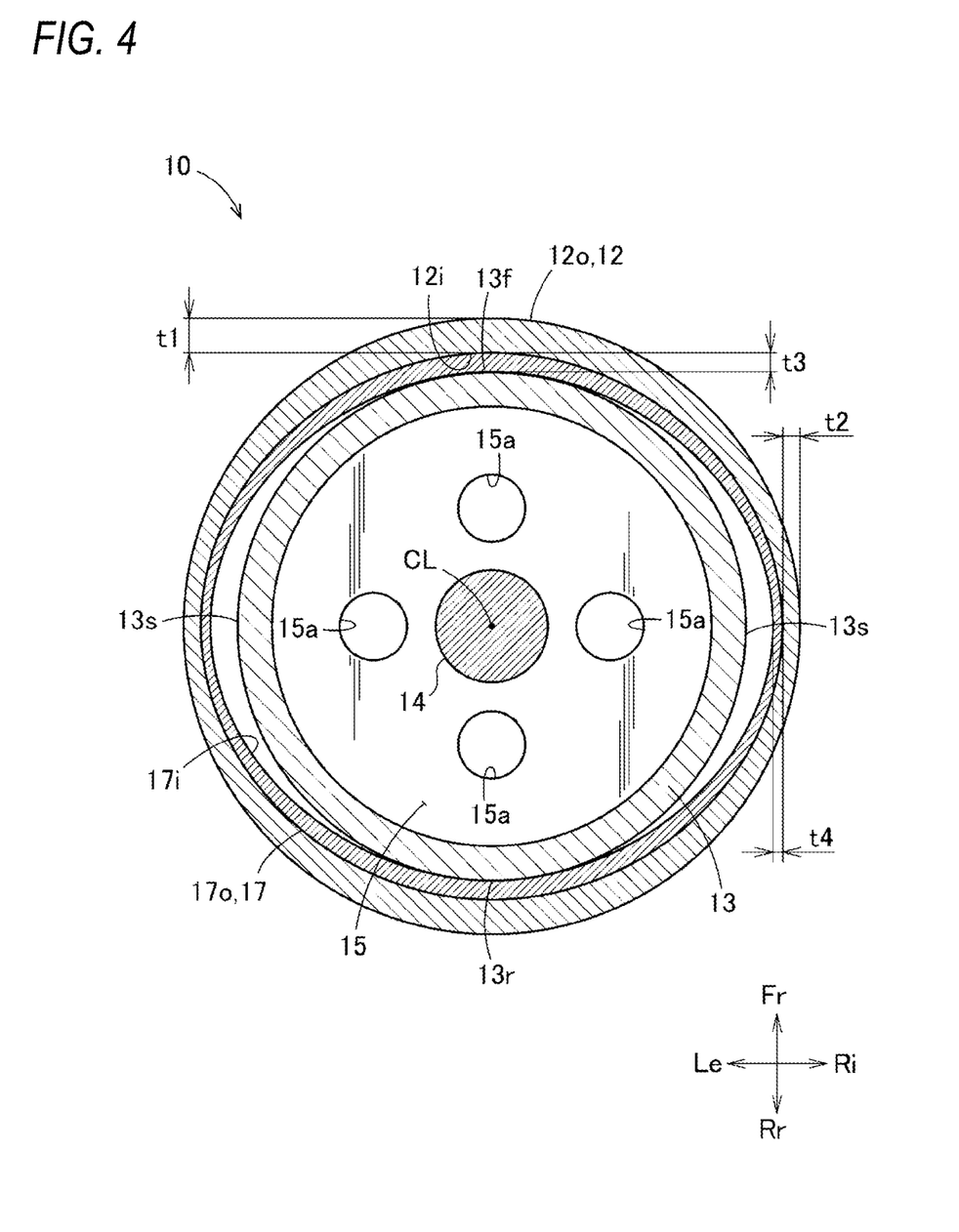
FIG. 4 is a sectional view taken along a line 4-4 of FIG. 3.

Reference is made to FIGS. 3 and 4. In the outer tube 12, a cross-sectional shape (hereinafter, simply referred to as a "cross section") of an outer peripheral surface 12o with an axis CL as a normal direction is circular throughout from the upper end to the lower end. On the other hand, a cross-sectional shape of the inner peripheral surface 12i of the outer tube 12 is an ellipse at least at a portion where the outer tube 12 comes into contact with the guide bush 17 fixed in the outer tube 12 (a portion where a cross section shown in FIG. 3 is obtained). The inner peripheral surface 12i of the outer tube 12 has a shape corresponding to an outer peripheral surface 17o of the guide bush 17 at least at a position where the outer tube 12 comes into contact with the guide bush 17 fixed in the outer tube 12 (a portion where the cross section shown in FIG. 3 is obtained).

As for a wall thickness of the outer tube 12, a thickness t1 of portions thereof that face a front surface 13f and a rear surface 13r of the inner tube 13 with the guide bush 17 interposed therebetween is the thickest, and a thickness t2 of portions thereof that face left and right side surfaces 13s of the inner tube 13 with the guide bush 17 interposed therebetween is the thinnest. That is, t1>t2. A wall thickness of a portion of the outer tube 12 connecting the portion having the thickness t1 and the portion having the thickness t2 continuously changes from t1 to t2 (or from t2 to t1).

The outer tube 12 may be connected to an axle of the front wheel.

The inner tube 13 is filled with oil Oi therein. The inner tube 13 can be made of steel, and for example, a pipe made of stainless steel may be used as the inner tube 13.

Reference is made to FIG. 2. The inner tube 13 has a substantially circular shape from the upper end to the lower end, and has a constant wall thickness. The inner tube 13 is provided so as to be movable relative to the lid 11, the outer tube 12, the rod 14, the piston 15, and the guide bushes 17, 17.

When the outer tube 12 is connected to the axle of the front wheel Fw (see FIG. 1), the inner tube 13 is connected to a vehicle body Bo (see FIG. 1).

The rod 14 is supported by the lid 11, and is provided so as to be movable inside the inner tube 13. The rod 14 is provided so as to be movable relative to the inner tube 13 together with the outer tube 12 and the lid 11.

The piston 15 is movable along an inner peripheral surface of the inner tube 13 together with the rod 14. The oil Oi can pass through oil passage holes 15a, and when the piston 15 moves together with the rod 14, the oil Oi that has passed through the oil passage holes 15a generates a damping force in a process of pushing and opening a valve (not shown) arranged on an outlet side of the oil passage holes 15a. As described above, the inner tube 13 is provided so as to be movable relative to the outer tube 12, the rod 14, the piston 15, and the guide bush 17. Therefore, the piston 15 can also generate a damping force when the inner tube 13 moves with respect to the outer tube 12. The piston 15 generates the damping force both at the time of extension and at the time of compression. For example, in a form shown in FIG. 4, the oil Oi passes through two oil passage holes 15a, among four oil passage holes 15a, during an extension stroke, and the oil Oi passes through the remaining two oil passage holes 15a during a compression stroke.

The urging member 16 is made of a coil spring, one end of the urging member 16 abuts against the inner tube 13, and the other end of the urging member 16 abuts against the piston 15. The urging member 16 urges the outer tube 12 upward via the piston 15 and the rod 14. An urging force of the urging member 16 acts in a direction in which the outer tube 12 and the inner tube 13 are separated from each other.

The urging member 16 may be provided in a form capable of urging a force in a direction in which the outer tube 12 and the inner tube 13 are separated from each other, and may be provided, for example, on outer peripheries or the like of the outer tube 12 and the inner tube 13.

Reference is made to FIG. 4. A material of the guide bush 17 is, for example, an aluminum-based alloy. In the present invention, the "aluminum-based alloy" is composed of pure aluminum and a group including aluminum alloys containing aluminum. Here, as described above, a material of the inner tube 13 is, for example, stainless steel. Therefore, when the material of the guide bush 17 is an aluminum-based alloy, it can be said that the material of the guide bush 17 has a Young's modulus lower than that of the material of the inner tube 13.

In a plan view, in other words, in a cross section, the guide bush 17 has an elliptical shape in which an inner peripheral surface 17i and the outer peripheral surface 17o are longer in the left-right direction than in the front-rear direction. However, a cross-sectional shape of the inner peripheral surface of the guide bush 17 and a cross-sectional shape of the outer peripheral surface of the guide bush 17 are not similar. Therefore, a wall thickness of the guide bush 17 continuously changes in a peripheral direction.

The guide bush 17 having an elliptical inner peripheral surface 17i abuts against the front surface 13f and the rear surface 13r of the cylindrical inner tube 13, and is separated from the left and right side surfaces 13s of the inner tube 13, respectively.

As for the wall thickness of the guide bush 17, a thickness t3 of portions thereof that abut against the front surface 13f and the rear surface 13r of the inner tube 13 is the thickest, and a thickness t4 of portions thereof that face the left and right side surfaces 13s of the inner tube 13 is the thinnest. That is, t3>t4.

In a portion where the guide bush 17 is fixed, the thickness t1 of the portions of the outer tube 12, which face the portions at which the guide bush 17 has the thickest wall thickness t3, is the thickest, and the thickness t2 of the portions thereof, which face the portions at which the guide bush 17 has the thinnest wall thickness t4, is the thinnest.

Figure 5:
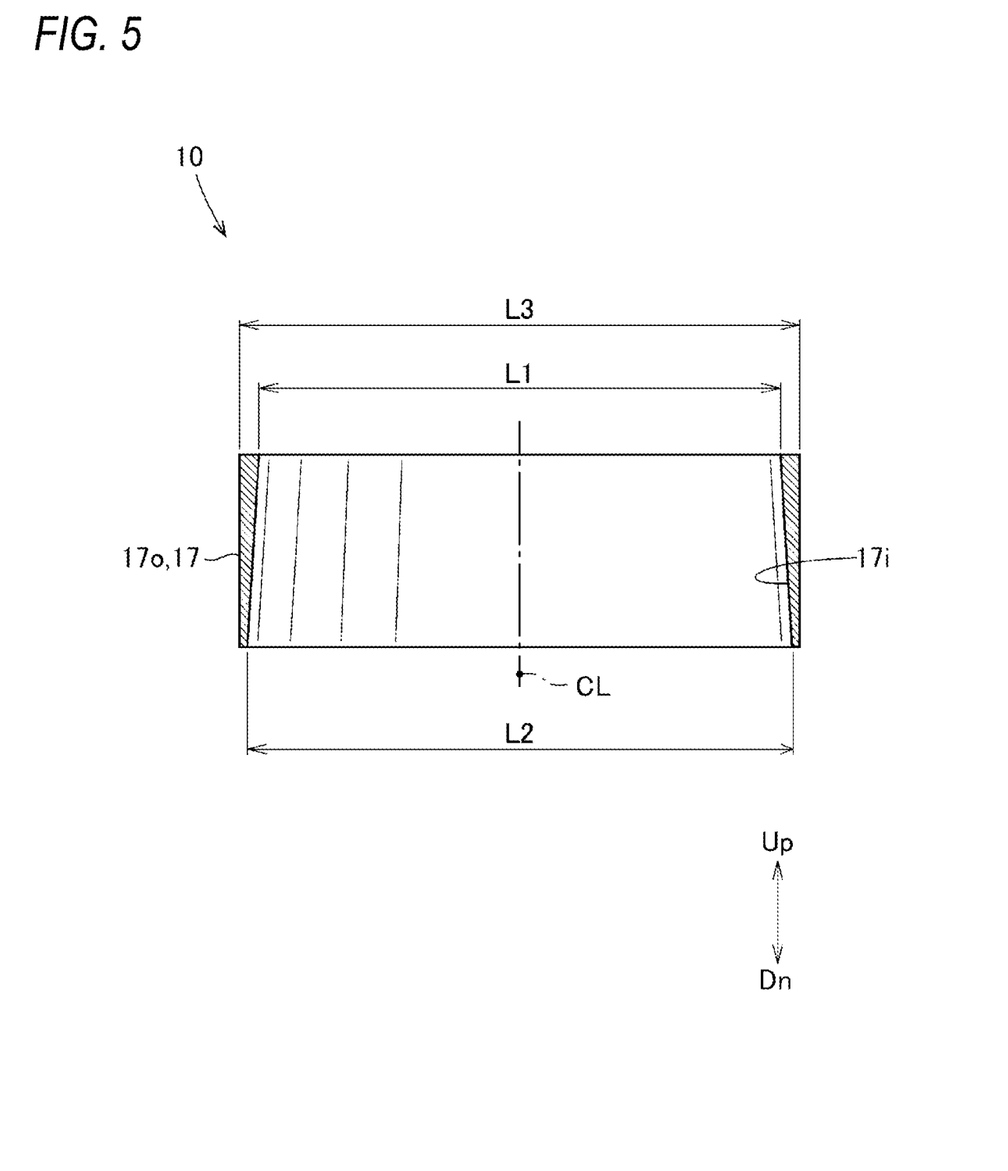
FIG. 5 is an enlarged view of a guide bush shown in FIG. 3.

Reference is made to FIG. 5. As for an inner peripheral length of the guide bush 17, an inner peripheral length L1 of the guide bush 17 on the upper end is the shortest, and an inner peripheral length L2 of the guide bush 17 on the lower end is the longest. That is, L1<L2. Here, the inner peripheral length refers to a peripheral length of the inner peripheral surface 17i of the guide bush 17 along a plane perpendicular to the axis CL. Similarly, an outer peripheral length refers to a peripheral length of the outer peripheral surface 17o of the guide bush 17 along a plane perpendicular to the axis CL. The inner peripheral length of the guide bush 17 continuously increases from the upper end (L1) to the lower end (L2). On the other hand, the outer peripheral length of the guide bush 17 is the same outer peripheral length L3 from the upper end to the lower end.

Therefore, the wall thickness of the guide bush 17 is the thickest at the upper end and is the thinnest at the lower end. In addition, the inner peripheral surface 17i of the guide bush 17 is a tapered surface continuously extending from the upper end toward the lower end with respect to the axis CL.

It is desirable to use an aluminum-based alloy as the material of the guide bush 17, but other materials such as steel can also be used.

Figure 6A:
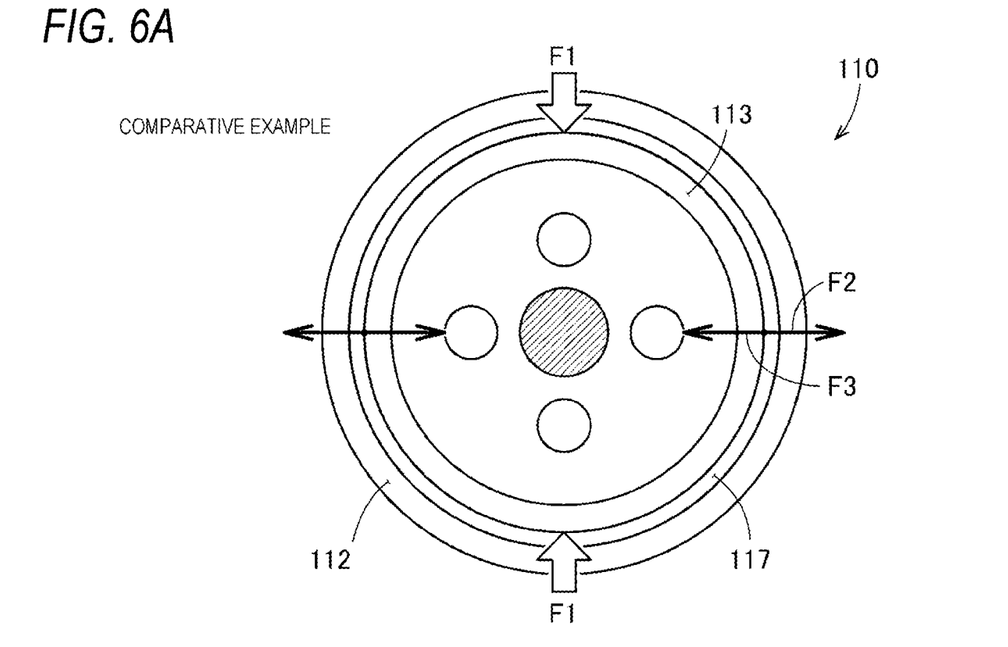
FIG. 6A is a view illustrating the action of a front fork according to a comparative example.

Reference is made to FIG. 6A. FIG. 6A shows a front fork 110 according to a comparative example. When the occupant applies a brake, loads are applied to an inner tube 113 mainly from the front-rear direction as indicated by arrows F1. As a result, the inner tube 113 extends in the left-right direction as indicated by arrows F2. A guide bush 117 abuts against an outer periphery of the inner tube 113. Therefore, due to the extension of the inner tube 113, a reaction force of the same force as that of the arrow F2 is applied to the inner tube 113 as indicated by an arrow F3. In a situation where the reaction force is applied, it is considered that a smooth displacement of the inner tube 113 is hindered since a frictional force when the inner tube 113 is displaced increases.

That is, the present inventors have found that when a load in the front-rear direction intersecting the axis is applied to the front fork 110, the inner tube 113 extends in the left-right direction, and at this time, a smooth operation of the inner tube 113 may be hindered by the reaction force received from the guide bush 117.

Figure 6B:
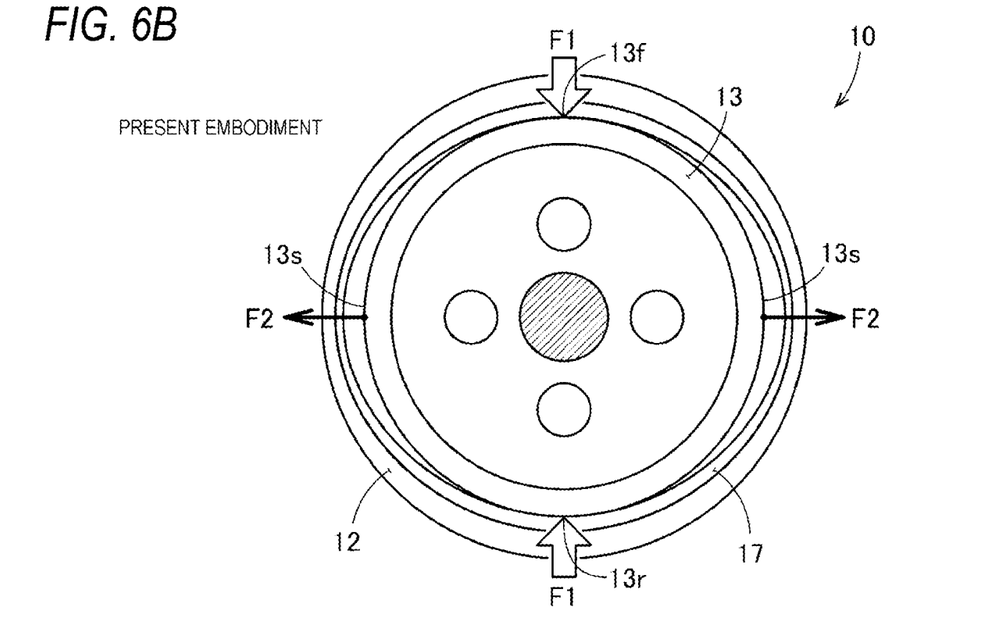
FIG. 6B is a view illustrating the action of the front fork according to the embodiment.

Reference is made to FIG. 6B. FIG. 6B shows the front fork 10 according to the embodiment. When the occupant applies the brake, loads are applied to the inner tube 13 mainly from the front-rear direction as indicated by the arrows F1. As a result, the inner tube 13 extends in the left-right direction as indicated by the arrows F2. The guide bush 17 abuts against the front surface 13f and the rear surface 13r of the inner tube 13 to movably hold the inner tube 13, and is separated from the left and right side surfaces 13s of the inner tube 13. Therefore, even when the inner tube 13 is deformed, the left and right side surfaces 13s of the inner tube 13 are not subjected to a reaction force from the guide bush 17, or can reduce the reaction force received from the guide bush 17. As a result, according to the front fork 10, even in a situation where the load indicated by the arrow F1 is applied, a frictional force when the inner tube 13 is displaced is unlikely to increase. Therefore, according to the present invention, it is possible to provide the front fork 10 capable of obtaining an appropriate damping force by preventing the displacement of the inner tube 13 from being hindered even when a load is applied.

The inner tube 13 has a cylindrical shape, and the inner peripheral surface of the guide bush 17 has an elliptical shape in which the cross-sectional shape is longer in the left-right direction than in the front-rear direction. In addition, the inner peripheral surface of the outer tube 12 has a shape along the outer peripheral surface of the guide bush 17 at least at a position where the guide bush 17 is fixed. By fitting the inner tube 13 and the guide bush 17 at predetermined positions, the side surface 13s of the inner tube 13 can be reliably separated from the guide bush 17. In this manner, the side surface 13s of the inner tube 13 can be separated from the guide bush 17 by a simple method of separating the side surface 13s of the inner tube 13 from the guide bush 17 depending on shapes of the respective components.

Reference is also made to FIG. 4. As for the wall thickness of the guide bush 17, the thickness t3 of portions thereof that abut against the front surface 13f and the rear surface 13r of the inner tube 13 is the thickest, and the thickness t4 of portions thereof that face the left and right side surfaces 13s of the inner tube 13 is the thinnest. When a deformation amount of the inner tube 13 is large, it is conceivable that the side surface 13s of the inner tube 13 abuts against the guide bush 17. In such a case, the reaction force applied to the inner tube 13 can be reduced by reducing the thickness of the guide bush 17 to reduce bending rigidity at a portion facing the side surface 13s of the inner tube 13. From such a point of view, the guide bush 17 has the thinnest portions facing the left and right side surfaces 13s of the inner tube 13, respectively. On the other hand, the inner tube 13 can be reliably held by increasing the wall thickness of the portion of the guide bush 17 that abuts against the inner tube 13. From such a point of view, the guide bush 17 is the thickest at the portions that abut against the front surface 13f and the rear surface 13r of the inner tube 13.

As for the wall thickness of the outer tube 12, the thinnest t1 of the portion of the outer tube 12, which faces the portion at which the guide bush 17 has the thickest wall thickness t3, is the thickest, and the thickness t2 of the portion thereof, which faces the portion at which the guide bush 17 has the thinnest wall thickness t4, is the thinnest. That is, the front fork 10 lowers the bending rigidity of the portion of the outer tube 12 that faces the portion of the guide bush 17 having a low bending rigidity. Therefore, it is preferable that the reaction force applied to the inner tube 13 can be reduced. On the other hand, by increasing the wall thickness of the portion that abuts against the thickest portion of the guide bush 17, the rigidity required for the outer tube 12 can be ensured.

The material of the guide bush 17 has the Young's modulus lower than that of the material of the inner tube 13. As described above, when the deformation amount of the inner tube 13 is large, it is conceivable that the side surface 13s of the inner tube 13 abuts against the guide bush 17. Even in such a case, by using a material having a Young's modulus lower than that of the material of the inner tube 13 as the material of the guide bush 17, the guide bush 17 is easily deformed following the inner tube 13. Therefore, it is preferable that the reaction force applied to the inner tube 13 can be reduced.

Reference is made to FIG. 5. As for the inner peripheral length of the guide bush 17, the inner peripheral length L1 of the guide bush 17 on the upper end is the shortest, and the inner peripheral length L2 of the guide bush 17 on the lower end is the longest. Accordingly, the inner tube 13 can be separated from the guide bush 17 at the lower end of the guide bush 17 than the upper end. Here, on a lower side where the front wheel is arranged, the deformation amount of the inner tube 13 becomes large. By greatly separating the inner tube 13 from the guide bush 17 on the lower side where the deformation amount of the inner tube 13 is large, the inner tube 13 can be more reliably displaced. As a result, the appropriate damping force is easily obtained even when a load is applied.

The inner peripheral length of the guide bush 17 is continuously increased from the upper end to the lower end. When the inner peripheral length is discontinuously increased from the upper end to the lower end, a portion where the inner peripheral length discontinuously changes is easily brought into line contact with the inner tube 13. In such a form, when the guide bush is brought into line contact with the inner tube, the reaction force applied to the inner tube tends to be partially excessive. In contrast, by continuously increasing the inner peripheral length of the guide bush 17 from the upper end to the lower end, an excessive reaction force can be suppressed from being applied to a part of the inner tube 13, and the inner tube 13 can be more reliably displaced. As a result, the appropriate damping force is easily obtained even when a load is applied.

On the other hand, the outer peripheral length of the guide bush 17 is the same from the upper end to the lower end. In addition, the wall thickness of the guide bush 17 is the thickest at the upper end and is the thinnest at the lower end. This makes it possible to simplify the shape of the outer tube 12 that receives the guide bush 17, which is preferable.

Next, a second embodiment of the present invention will be described with reference to the drawings.

Second Embodiment

Figure 7:
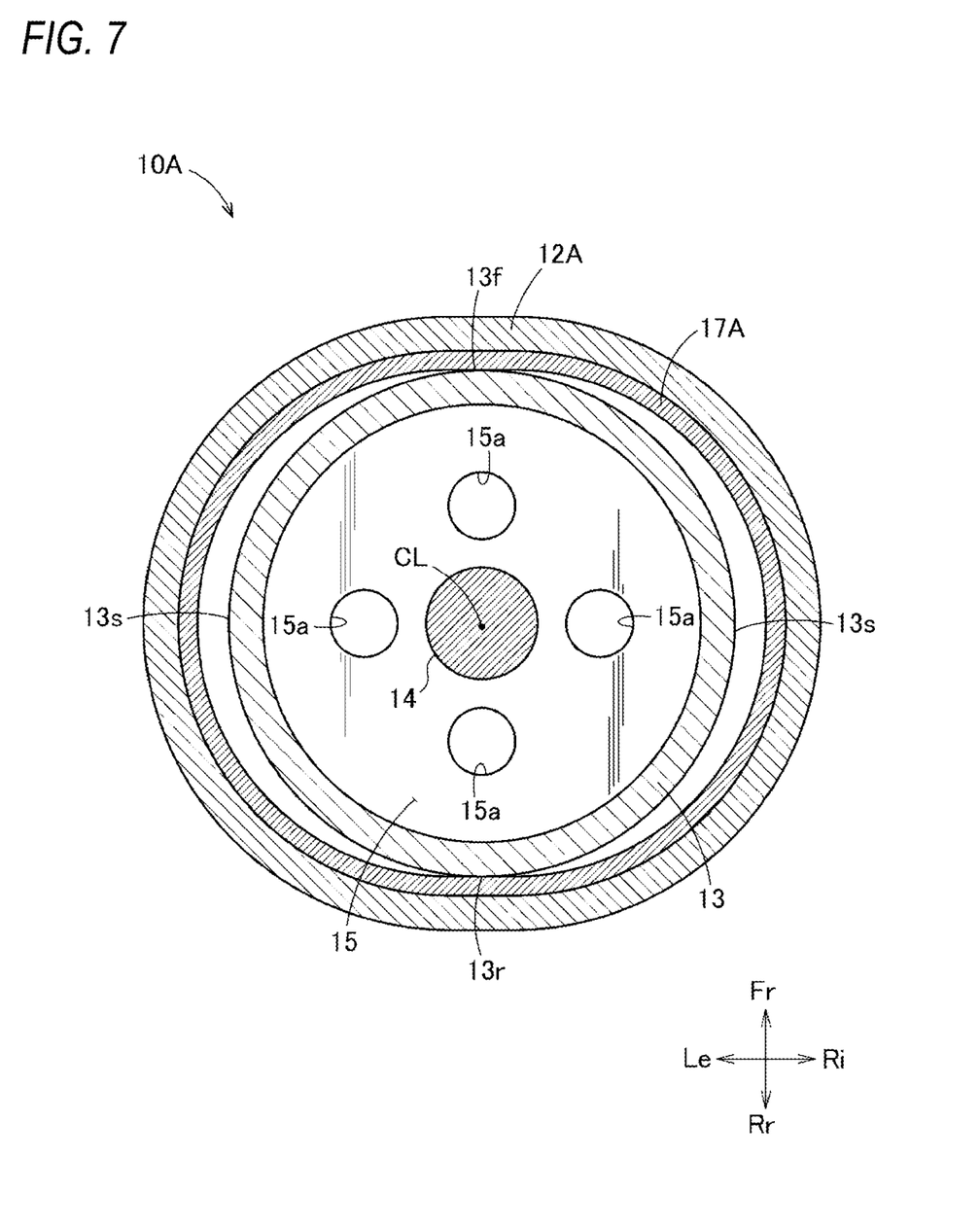
FIG. 7 is a sectional view of a front fork according to a second embodiment.

FIG. 7 shows a cross-sectional configuration of a front fork 10A according to the second embodiment, and corresponds to FIG. 4 described above. In the front fork 10A according to the second embodiment, instead of the guide bush 17 (see FIG. 4) and the outer tube 12 (see FIG. 4) used in the front fork 10 (see FIG. 4) according to the first embodiment, a guide bush 17A and an outer tube 12A each having an oblong shape in a plan view are used.

The outer tube 12A is different from the outer tube 12 (see FIG. 4) in that the outer tube 12A has a uniform wall thickness over the entire circumference, and cross-sectional shapes of an inner peripheral surface and an outer peripheral surface are oblong. In addition, the guide bush 17A is also different from the guide bush 17 (see FIG. 4) in that the guide bush 17A has a uniform wall thickness over the entire circumference, and cross-sectional shapes of an inner peripheral surface and an outer peripheral surface are oblong. In the present application, a term "oblong" refers to a shape in which two semicircles arranged to face each other are connected by straight lines having the same length. The oblong is different from the ellipses formed by a curved line in that the oblong has the straight lines.

The other basic configuration is the same as that of the front fork according to the first embodiment. Components common to those of the first embodiment are denoted by the same reference numerals, and a detailed description thereof will be omitted.

The guide bush 17A has the oblong shape that is longer in the left-right direction than in the front-rear direction. In addition, the outer tube 12A has the oblong shape that is longer in the left-right direction than in the front-rear direction at least at a portion where the guide bush 17A is fixed.

As a result, the front surface 13f and the rear surface 13r of the cylindrical inner tube 13 abut against the guide bush 17A, and the left and right side surfaces 13s thereof are separated from the guide bush 17A, respectively.

The front fork 10A described above also achieves a predetermined effect of the present invention.

Next, a third embodiment of the present invention will be described with reference to the drawings.

Third Embodiment

Figure 8:
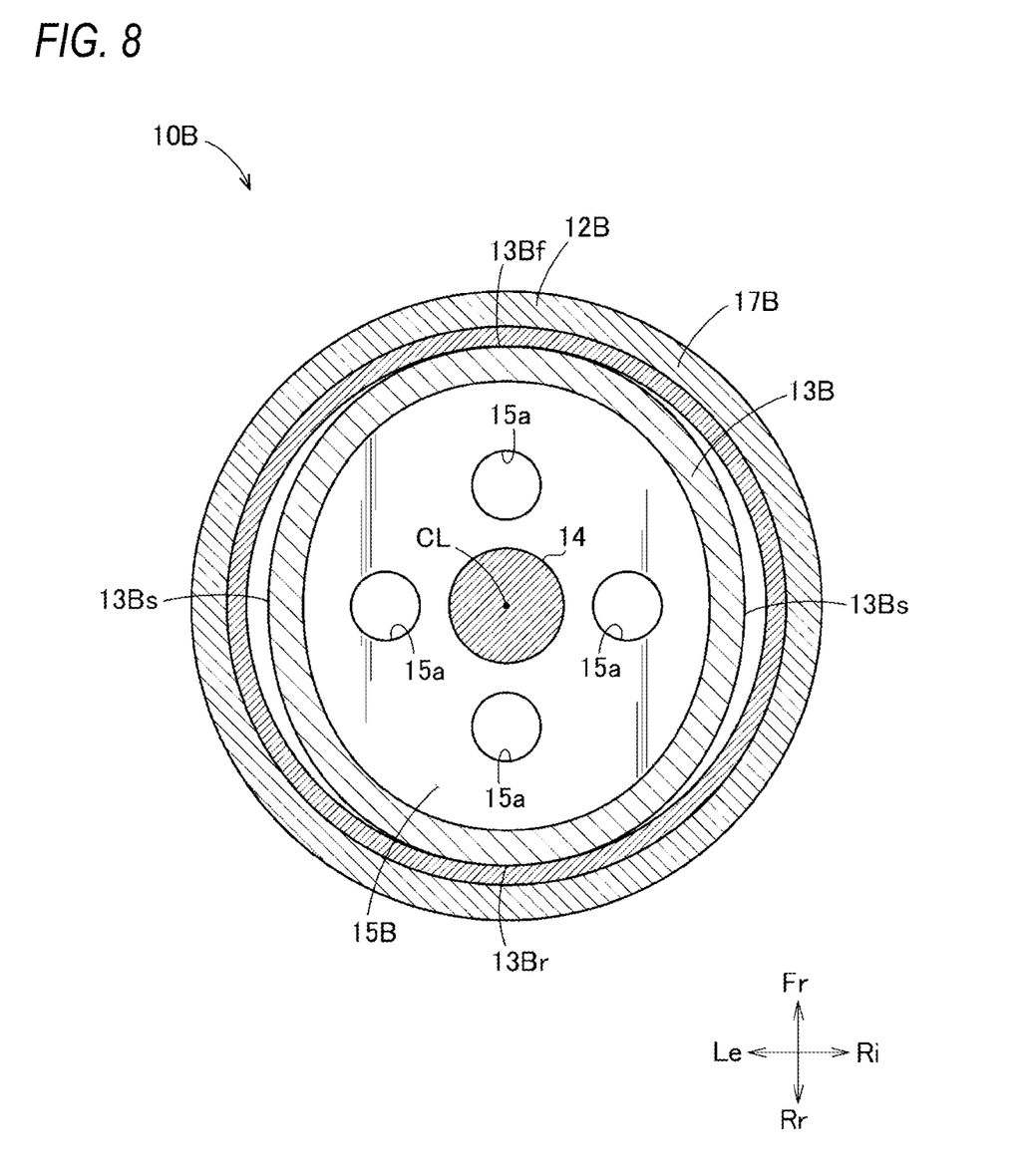
FIG. 8 is a sectional view of a front fork according to a third embodiment.

FIG. 8 shows a cross-sectional configuration of a front fork 10B according to the third embodiment, and corresponds to FIG. 4 described above. In the front fork 10B according to the third embodiment, instead of the guide bush 17 (see FIG. 4) and the outer tube 12 (see FIG. 4) used in the front fork 10 (see FIG. 4) according to the first embodiment, a guide bush 17B and an outer tube 12B each having a cylindrical shape are used. On the other hand, cross-sectional shapes of an inner tube 13B and a piston 15B each are an elliptical shape that is longer in the front-rear direction than in the left-right direction. The other basic configuration is the same as that of the front fork according to the first embodiment. Components common to those of the first embodiment are denoted by the same reference numerals, and a detailed description thereof will be omitted.

As shown in FIG. 8, the inner tube 13B and the piston 15B may each have an oblong shape that is longer in the front-rear direction than in the left-right direction. A definition of "oblong" is as described above.

A front surface 13Bf and a rear surface 13Br of the inner tube 13B abut against the guide bush 17B, and left and right side surfaces 13Bs thereof are separated from the guide bush 17B, respectively.

The front fork 10B described above also achieves the predetermined effect of the present invention.

It should be noted that the shock absorber of the present invention can be mounted on another straddle-type vehicle such as a three-wheeled vehicle or a buggy other than a two-wheeled vehicle. Further, although the front fork has been described using the inverted front fork as an example, the front fork can also apply an upright front fork, and is not limited to these types of front forks. In addition, a configuration in which the rod 14 is supported by the inner tube 13 can be adopted as appropriate. Further, the shock absorber of the present invention may be the rear cushion, and the shock absorber of the present invention can also be applied to both the front fork and the rear cushion of the straddle-type vehicle.

Furthermore, the embodiments can be combined as appropriate. For example, the wall thickness of the guide bush used in the second embodiment or the third embodiment can be changed depending on the portion, or the wall thickness of the outer tube can be changed depending on the portion. In addition, the inner peripheral length of the guide bush used in the second embodiment or the third embodiment can be changed from the upper end to the lower end as appropriate.

The two guide bushes may have different configurations. At least one of the upper and lower guide bushes needs to satisfy constituent requirements of the present invention, but it is preferable that the guide bush closer to the front wheel or the rear wheel satisfies the requirements.

The present invention is not limited to the embodiments as long as the actions and effects of the present invention are achieved.

INDUSTRIAL APPLICABILITY

The shock absorber of the present invention is suitable for a motorcycle.

REFERENCE SIGNS LIST 10, 10A, 10B front fork (an example of a shock absorber of the present invention)
12, 12A, 12B outer tube
13, 13B inner tube
13u upper end (distal end)
13d lower end (the other end)
13f, 13Bf front surface
13r, 13Br rear surface
13s, 13Bs side surface
14 rod
15, 15B piston
16 urging member
17, 17A, 17B guide bush
30 rear cushion (an example of a shock absorber of the present invention)
Oi Oil
Bo vehicle body
Fw front wheel (vehicle wheel)
Rw rear wheel (vehicle wheel)

What is claimed is:
1. A shock absorber comprising:
a tubular outer tube that is connectable to either a vehicle wheel or a vehicle body;
a tubular inner tube that includes a distal end provided inside the outer tube and a terminal end being connectable to either the vehicle wheel or the vehicle body to which the outer tube is not connected, is provided so as to be movable relative to the outer tube, and is filled with oil therein;
a rod that is provided inside the inner tube and is supported by the outer tube or the inner tube;
a piston that is fixed to the rod and is configured to generate a damping force when the inner tube moves relative to the outer tube;

an urging member that is configured to urge the outer tube and the inner tube in a direction in which the outer tube and the inner tube are separated from each other; and a guide bush that is a ring-shaped member arranged along an inner peripheral surface of the outer tube, abuts against a front surface and a rear surface of the inner tube to movably hold the inner tube, and is separated from left and right side surfaces of the inner tube, wherein an inner peripheral surface of the guide bush has a cross-sectional shape with an axis of the inner tube as the normal direction, said cross-sectional shape being longer in a left-right direction than in a front-rear direction.

2. The shock absorber according to claim 1,
wherein at least when a load in a direction intersecting the axis of the inner tube is not applied, an inner peripheral surface and an outer peripheral surface of the inner tube have a circular cross-sectional shape with the axis as a normal direction, and
wherein the inner peripheral surface of the outer tube has a shape along an outer peripheral surface of the guide bush at least at a portion where the outer tube comes into contact with the guide bush fixed in the outer tube.

3. The shock absorber according to claim 2,
wherein as for a wall thickness of the guide bush, a thickness of portions thereof that abut against the front and rear surfaces of the inner tube is thickest, and a thickness of portions thereof that face the left and right side surfaces of the inner tube is thinnest.

4. The shock absorber according to claim 3,
wherein as for a wall thickness of the outer tube, a thickness of a portion thereof that faces the thickest portion of the guide bush is thickest, and a thickness of a portion thereof that faces the thinnest portion of the guide bush is thinnest.

5. The shock absorber according to claim 2,
wherein a material of the guide bush has a Young's modulus lower than that of a material of the inner tube.

6. The shock absorber according to claim 2,
wherein an inner peripheral length of the guide bush is shortest at an upper end and is longest at a lower end.

7. The shock absorber according to claim 6,
wherein the inner peripheral length of the guide bush continuously increases from the upper end to the lower end.

8. The shock absorber according to claim 6,
wherein an outer peripheral length of the guide bush is the same from the upper end to the lower end, and
wherein the wall thickness of the guide bush is the thickest at the upper end and the thinnest at the lower end.

9. The shock absorber according to claim 2,
wherein the vehicle wheel is a front wheel.

10. The shock absorber according to claim 1,
wherein as for a wall thickness of the guide bush, a thickness of portions thereof that abut against the front and rear surfaces of the inner tube is thickest, and a thickness of portions thereof that face the left and right side surfaces of the inner tube is thinnest.

11. The shock absorber according to claim 10,
wherein as for a wall thickness of the outer tube, a thickness of a portion thereof that faces the thickest portion of the guide bush is thickest, and a thickness of a portion thereof that faces the thinnest portion of the guide bush is thinnest.

12. The shock absorber according to claim 10,
wherein a material of the guide bush has a Young's modulus lower than that of a material of the inner tube.

13. The shock absorber according to claim 10,
wherein an inner peripheral length of the guide bush is shortest at an upper end and is longest at a lower end.

14. The shock absorber according to claim 13,
wherein the inner peripheral length of the guide bush continuously increases from the upper end to the lower end.

15. The shock absorber according to claim 1,
wherein a material of the guide bush has a Young's modulus lower than that of a material of the inner tube.

16. The shock absorber according to claim 1,
wherein an inner peripheral length of the guide bush is shortest at an upper end and is longest at a lower end.

17. The shock absorber according to claim 16,
wherein the inner peripheral length of the guide bush continuously increases from the upper end to the lower end.

18. The shock absorber according to claim 16,
wherein an outer peripheral length of the guide bush is the same from the upper end to the lower end, and
wherein the wall thickness of the guide bush is the thickest at the upper end and the thinnest at the lower end.

19. The shock absorber according to claim 1,
wherein the vehicle wheel is a front wheel.

20. A shock absorber comprising:
a tubular outer tube that is connectable to a vehicle body;
a cylindrical inner tube that is a member made of steel in which a distal end is provided inside the outer tube, is provided so as to be movable relative to the outer tube, is filled with oil and includes a terminal end being connectable to a vehicle wheel;
a rod that is provided inside the inner tube and is supported by the outer tube or the inner tube;
a piston that is fixed to the rod and is configured to generate a damping force when the inner tube moves relative to the outer tube;
an urging member that is configured to urge the outer tube and the inner tube in a direction in which the outer tube and the inner tube are separated from each other; and
a guide bush made of an aluminum-based alloy that is an elliptical ring-shaped member arranged along an inner peripheral surface of the outer tube, abuts against a front surface and a rear surface of the inner tube to movably hold the inner tube, and is separated from left and right side surfaces of the inner tube,
wherein as for a wall thickness of the guide bush, a thickness of portions thereof that abut against the front and rear surfaces of the inner tube is thickest, and a thickness of portions thereof that face the left and right side surfaces of the inner tube is thinnest, and the wall thickness of the guide bush is the thickest at an upper end, and is the thinnest at a lower end,
wherein an inner peripheral surface of the guide bush has a tapered shape, in which an inner peripheral length is shortest at the upper end, and is longest at the lower end, and
wherein an outer peripheral length of the guide bush is the same from the upper end to the lower end.

* * * * *